April 5, 1960          E. BURRELL          2,931,849
METHOD OF MANUFACTURING DEFERRED ACTION BATTERIES
Filed July 8, 1947          2 Sheets-Sheet 1

Inventor
ELLIS BURRELL

April 5, 1960     E. BURRELL     2,931,849
METHOD OF MANUFACTURING DEFERRED ACTION BATTERIES
Filed July 8, 1947

Inventor
ELLIS BURRELL

United States Patent Office 2,931,849
Patented Apr. 5, 1960

2,931,849

METHOD OF MANUFACTURING DEFERRED ACTION BATTERIES

Ellis Burrell, Rochester, N.Y., assignor to the United States of America as represented by the Secretary of the Navy Application July 8, 1947, Serial No. 759,629

17 Claims. (Cl. 136—175)

This invention relates to methods of making insulated battery assemblies, more particularly in respect to deferred action batteries for use in military missiles.

An object of the invention is to provide insulating members which will not be displaced by heavy stresses.

Another object of the invention is to provide for the installation of an insulating and sealing jacket in electrical equipment subject to rough usage.

A further object of the invention is to provide for the installation of an insulating jacket in a deferred-action battery capable of functioning at very high speeds of both rotation and linear displacement.

An additional object of the invention is to provide a method of assembling plastic elements within a casing.

Another object of the invention is to provide for the complete elimination of voids in and around the insulating jacket of a battery assembly.

While the invention is described herein for use in connection with deferred-action batteries, it will be obvious that it has a wide variety of applications to batteries of many other types, and in other electrical apparatus, as well as general application in non-electrical devices. The invention involves the use of novel steps to insure a dense insulating structure without voids for enclosing and sealing the plates of multi-cell batteries in order to eliminate leakage of the electrolyte from the peripheries of the annular cells forming said batteries.

Deferred-action batteries are especially adapted for use in the fuse mechanisms of electrically detonated high explosive projectiles. However, difficulties have been experienced in employing these batteries, coaxially mounted in projectiles, as a result of the high centrifugal force generated by the rapid rotation of the projectile. The speeds of rotation involved are of the order of hundreds of revolutions per second, and centrifugal force has operated to pull the insulating jacket away from the peripheries of the stack of cells. This permitted the electrolyte to leak from the cells inasmuch as the washers or separators in the cells cannot prevent leakage under such stresses. Frequent fuse failures resulted from this leakage; not only because the leakage reduced the quantity of active components in the cells, but also from the even more serious drawback of the short-circuiting of cells by electrolyte on the outside of the cells.

The separation of the insulated jacket from the stack of cells under high centrifugal force resulted from voids in or around the jacket. One type of void was the tolerance provided between the insulated jacket and the battery case for slipping the insulated assembly into the case. Another type consisted of the voids between the stack of cells and the insulated jacket. In addition it is likely that some of the voids were internal, such as air bubbles within the insulating jacket itself. Regardless of the particular type of void, the material of the insulated jacket tended to flow or creep away from the stack of cells and fill the voids under the pull resulting from extremely rapid rotation.

The defects mentioned are avoided by packing the insulating jacket into the space between the stack of cells and the battery case under pressure or heat to completely fill all voids and cavities. When this has been done, no difficulty is encountered with leakage, as there are no empty spaces into which insulating material may creep or flow away from the stack of cells.

This invention contemplates an insulating jacket made of any of a wide variety of plastics; however, thermoplastics "Vinylites" are preferred. While satisfactory insulating jackets may be formed of non-elastic plastics, the best results are secured with very soft rubbery compounds such as "Tygon" or "Vinylite" of the V-G 7734 formula. "Vinylites" are thermoplastic resins composed of polymers or co-polymers of vinyl chloride and vinyl acetate.

The term "plastics" as used herein covers elastomers, hard rubber compositions, and all natural and synthetic materials of either thermo-setting or thermoplastic nature. The term "elastomers" is herein employed to indicate any rubbery, resilient material including natural rubber as well as synthetic compositions.

The invention can best be understood by first referring to the structure of the battery assembly. Inasmuch as the electrical connections play no part in the present invention, these are not described herein. While various types of plates and electrolytes thereof may be employed, the battery disclosed is of the carbon-zinc plate type. It should be noted that the battery is in an inverted position in Figs. 2, 3 and 4.

Figure 1:
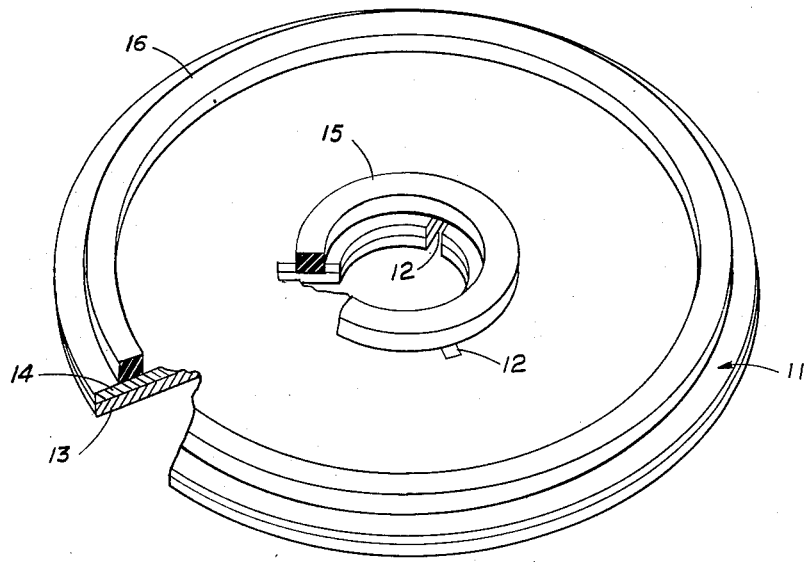
Fig. 1 is an enlarged view in perspective showing the manner in which the battery plates are assembled.

Referring to Fig. 1, all of the discs 11 are of identical construction, having notches 12 cut in the central apertures and carbon layers 13 bonded to one side of each zinc disc. Thus each disc 11 constitutes two plates, a carbon plate 13 and a zinc plate 14. The inner washer 15 and the outer washer 16 serve as both plate separators and as walls of the annular cells. Accordingly, Fig. 1 shows a complete battery cell less the electrolyte and is assembled (Fig. 2) with a carbon layer 13 facing the zinc-layer 14 of the adjacent cell. Referring again to Fig. 2, when a cell is activated, the annular cell space 17, bounded by two of the discs 11 and washers 15 and 16, will be filled with an electrolyte admitted through notches 12 from the cavity 18 in the cell stack 19.

Figure 2:
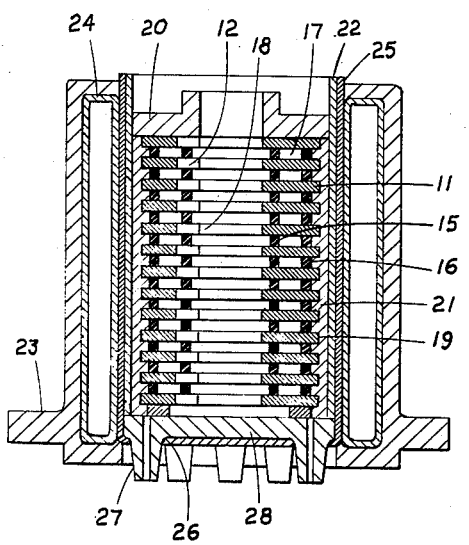
Fig. 2 is a vertical cross-section illustrating one modification of the invention.

The pre-molding of the sub-assembly illustrated in Fig. 2 is carried out by previously known methods in equipment developed for the purpose. Upon a mandrel which engages the notches 12 to hold discs 11 in registry, the discs are assembled in proper sequence together with the washers 15 and 16 and a pre-molded hard "Vinylite" thimble 20. Insulating jacket 21 of either a rubbery or hard type "Vinylite" and a pre-molded hard "Vinylite" turret plate 28 are applied to the stack 19 while on the mandrel or by preforming under low pressure in a conventional mold. Next, a laminated liner 22, preferably a waxed paper, is applied to the jacket 21. This sub-assembly may be employed with any of the methods of assembly described herein. The use of liner 22 is optional. However, the jacketed cell stock, thimble and turret plate may be introduced individually into the final mold and bonded together at that time rather than in this preforming operation, whenever heat is employed in assembling the battery in the casing.

The cylindrical mold 23 of Fig. 2 is preferably of the separable type and is provided with elements 24 heated by any suitable means. In this modification of the process, a battery casing 25 formed of sheet metal is inserted in the mold 23. The casing 25 is a cylindrical cup open at one end and having holes 26 to accommodate the turrets 27 of turret plate 28. The turrets 27 house the terminals of the electrical connections to the terminal plates of the battery. At normal temperatures, the sub-assembly shown above the mold is oversize, that is, its external diameter is slightly greater than the internal diameter of casing 25. However, the sub-assembly is pre-shrunk by cooling to a low temperature, and the casing 25 expands from the heat of mold 23. This cooling of the sub-assembly may be accomplished by mechanical refrigeration, Dry Ice (solid carbon dioxide), liquid air or any other suitable means. Accordingly, no difficulty is experienced in slipping the sub-assembly into the casing. There the sub-assembly receives heat from the casing and expands to fill all crevices, voids and tolerances within the casing and around the circumference of the discs 11. In addition, the thermoplastic turret plate 28, insulating jacket 21 and thimble 20 are softened and bonded together. Upon removal from the heated mold, the battery assembly begins to cool. Since the battery casing is at a somewhat higher temperature, and has a greater coefficient of expansion than the plastic members, it shrinks more in cooling than these interior members and thus provides an added degree of compression to insure that all empty spaces located outside of cell stack 19 are completely filled with the insulating material. Thereafter, the open end of the battery is finished in a manner similar to that described in conjunction with Fig. 5. In this particular method of assembly the insulating jacket 21 may be made of either a rigid or hard plastic or an elastomer. If used, the liner 22 may serve to "oversize" the assembly by pre-molding the insulating jacket 21 to an external diameter exactly equal to the internal diameter of the casing 25 when both at normal temperatures.

Figure 3:
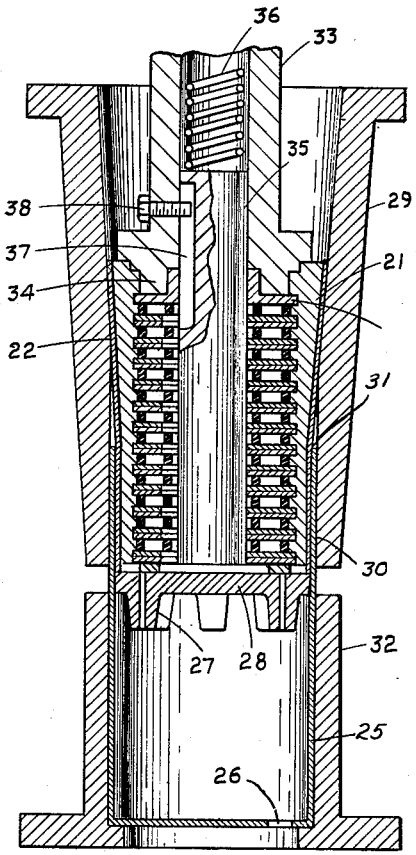
Fig. 3 is a vertical section showing another modification of assembling the battery components.

Another manner of assembling a battery is disclosed in Fig. 3. Here, the oversize sub-assembly is subjected to a longitudinally directed force in a tapering mold thereby applying both longitudinal and radial pressure to the sub-assembly while sliding it into the casing 25. This compression fills any voids, permanently seals the insulating jacket 21 to the stack 19 and to either the liner 22 or casing 25. In this modification, the liner 22 is an optional but preferred feature, and only an elastomer is satisfactory as the insulating jacket material. The stationary conical form 29 is fashioned with a counter-bore 30 at the lower end to receive the open end of the casing 25. The interior of this form has a constant taper from the top down to the throat 31 at the top of the counter-bore. The battery casing is mounted in a portable hollow base 32 which affords proper support for the casing to withstand the pressure during the operation. Power is applied to this mold or press through a reciprocable tubular arbor 33 which carries a die 34 and a spring-mounted guide plunger 35 urged downward by spring 36 mounted within the arbor. The plunger is fixed against rotation and allowed a limited amount of longitudinal movement by the slot 37 and screw 38 which does not extend to the bottom of the slot. In addition, the plunger is provided with ridges (not shown) which enter the notches 12 in discs 11 to keep the discs aligned. The ridges, screw and slot maintain the alignment of turrets 27 with holes 26 in the casing. Plunger 35 is also provided with grooves (not shown) as necessary, to provide space for the metallic tabs or electrical conductors, which connect the various plates of the battery terminals.

In carrying out the compression step of Fig. 3, the oversized sub-assembly is placed on plunger 35, while the battery casing 25 is set in the counter-bore 30 and hollow-base 32. As the plunger descends into form 29 the resilient, insulating jacket 21 is compressed radially by the tapering form as well as longitudinally by the die 34. Waxed liner 22 serves to lubricate the form during this operation. If the form 29 tends to pull the liner 22 off of jacket 21, this difficulty can be overcome in the premolding step by bonding the liner to the jacket by a suitable cement, or by tucking an edge of the liner 22 in between turret plate 28 and jacket 21. As the arbor 33 continues downward, compression increases until the throat 31 is reached, and the sub-assembly may be readily pushed into the casing with turrets 27 projecting through holes 26. When the insulating jacket is pressed into the casing with no tolerances allowed, no difficulty is experienced with the jacket later separating from the cell stack to permit leakage of the electrolyte. The finishing steps of the process are set forth elsewhere in connection with Fig. 5.

Figure 4:
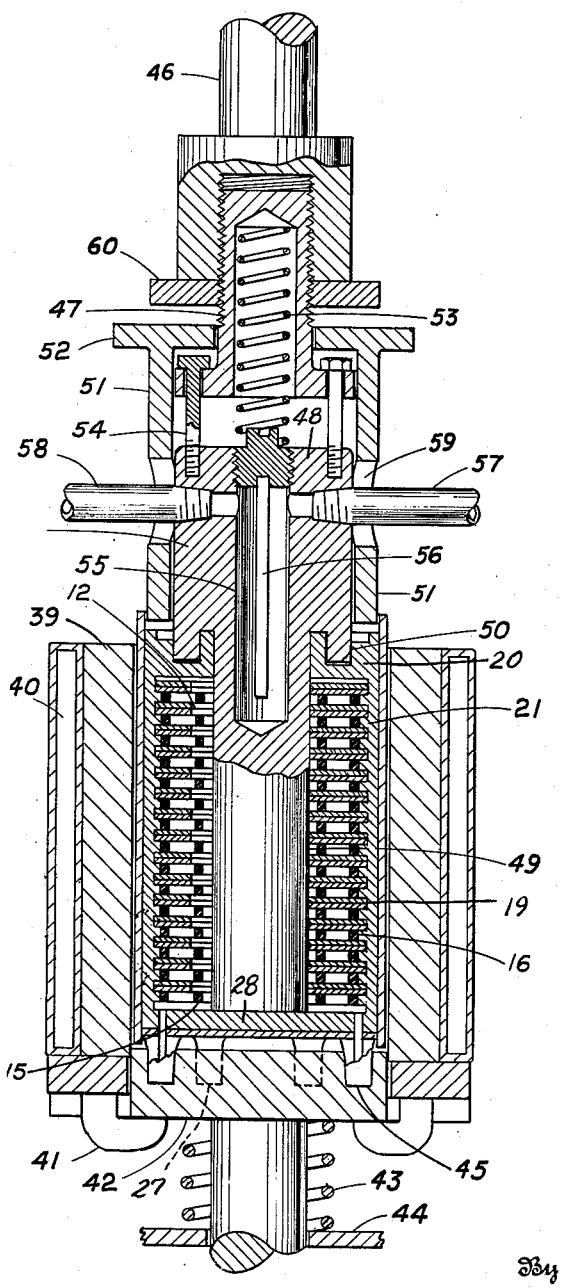
Fig. 4 is a similar view representing a further modification of the invention.

In Fig. 4, another modification of the method of assembling the battery is shown in which an entirely different type of molding apparatus is employed. Either a rigid plastic material or an elastomer may be used for the insulating jacket 21. In this case, the same sub-assembly is used except that it is not oversized in respect to the casing; in fact, a small tolerance or undersizing is recommended.

The stationary cylindrical mold 39 is surrounded by a jacket 40 and heated by electricity or other suitable means. It is provided with stops 41, which limit the downward movement of die 42. The die 42 is resiliently mounted on spring 43 bearing against fixed support 44. This die has recesses 45 to receive the turrets 27. Pressure is applied from any suitable source through a reciprocable arbor 46 coupled by the flanged and threaded bushing 47 with a pilot head 48 having a guide boss 49 and an integral annular flange 50. Surrounding the pilot head is a die sleeve 51 with an upper flange 52. Pilot head 48 is resiliently mounted on spring 53 which extends into a tubular recess in bushing 47. Guide pins 54 extend through holes in the flange of bushing 47 and are screwed into tapped holes in the pilot head 48. These pins serve to limit the extension of spring 53 and retain the pilot head within the upper die assembly. Pilot head 48 and the upper portion of guide boss 49 are provided with a cavity 55 in which is located a baffle 56 extending from the top of the cavity to within a short distance of its bottom. This cavity serves as a water jacket through which cooling water is circulated from inlet pipe 57 into right side of the cavity under the baffle 56 and up the left side to outlet pipe 58. The purpose of circulating water is to cool the upper portion of the pilot head, thereby preventing plastic thimble 20 from being softened by the heat applied to the mold. Die sleeve 51 is fitted loosely on the pilot head 48 and bushing 47 and is provided with slotted apertures 59 to permit the water lines to pass through to the pilot head. Lock nut 60 securely fastens bushing 47 to arbor 46.

In commencing a cycle of operations with this apparatus, the mold 39 is empty and heated; arbor 46 is retracted upward; die 42 is held at about the level of the top of the mold by the pressure of spring 43 and cooling water is flowing through cavity 55 in pilot head 48. The subassembly is inserted into battery casing 25 and placed on die 42 with the turrets 27 extending downwardly into the die recesses 45. Thereupon, the arbor is lowered so that the guide boss 49 passes through the opening in thimble 20 downward into the center of the cell stack 19. The pilot head continues downward without appreciable resistance until the guide boss reaches the turret plate 28 as die flange 50 reaches the flange of thimble 20 simultaneously. As the arbor continues downward spring 53 is compressed and die sleeve 51 enters the battery casing. Meanwhile, the insulating jacket 21 and turret plate 28, and the outer portion of thimble 20, are being softened by the heat from jackets 40. Continued application of pressure to arbor 46 brings lock nut 60 into contact with flange 21 of the die sleeve 51. At this point, the principal compressing and integrating of the plastic elements of the battery occurs as heavy pressure forces the softened plastic material into all voids and crevices within the casing and completes the bonding of the plastic elements into an integral unit. After a suitable period the arbor is withdrawn, and the retracted lower die rises from the stops 41 under the pressure of spring 43 to push the battery assembly from the mold. The apparatus is now in position to commence another operating cycle.

Figure 5:
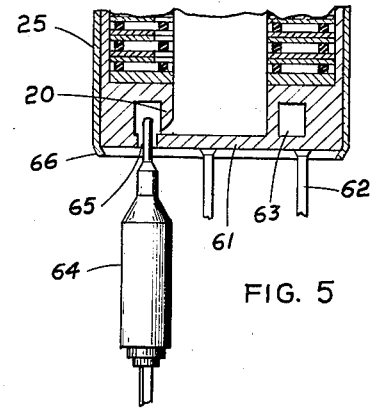
Fig. 5 is a fragmentary sectional view showing a portion of the battery in the upright position during a later step in the manufacture.

Regardless of the method employed in assembling the cell stack in the casing, the finishing steps are the same. The assembly is set aside to cool in order to harden the thermoplastic material. After the battery cools, an ampoule of electrolyte and associated members are inserted in the center cavity 18 of the cell stack. Referring to Fig. 5, the bottom pin plate 61 of the battery, provided with pins 62, is placed in position bearing on the hub of thimble 20, and the annular void 63 left between the flange of thimble 20 and the pin plate 61 is then filled by a potting operation. This is accomplished by inserting an injector 64 into void 63 through an opening 65 in the pin plate and injecting plastic material in the fluid state. Next, the free edge 66 of the metal casing 25 is rolled, crimped, or beaded over onto the edge of the pin plate, thus finishing the assembly.

It should be understood that the invention is not limited to the detailed examples set forth above, as these merely constitute preferred embodiments thereof, but is limited only by the time and proper scope of the appended claims.

I claim:

1. The step in manufacturing a battery, comprising compressing a sub-assembly of plastic insulating material and cells within a battery casing, whereby the insulating material completely fills the space between the cells and the casing.

2. The steps in manufacturing a battery, comprising contracting a sub-assembly of plastic insulating material and cells and inserting the sub-assembly in a battery casing, whereby the insulating material completely fills the space between the cells and the casing.

3. The steps in manufacturing a battery, comprising contracting a sub-assembly of plastic insulating material and cells, expanding a battery casing, inserting the sub-assembly in the casing to expand the sub-assembly, and contracting the casing, whereby the insulating material completely fills the space between the cells and the casing.

4. The steps in manufacturing a battery, comprising contracting a sub-assembly of cells covered with plastic insulating material by cooling it substantially below atmospheric temperature, expanding a battery casing by heating it substantially above atmospheric temperature, inserting said cold sub-assembly into said hot casing to expand the sub-assembly, and contracting the casing by cooling it to atmospheric temperature, whereby the insulating material completely fills the space between the cells and the casing.

5. The step in manufacturing a battery, comprising applying pressure longitudinally and transversely to a sub-assembly of cells having a side covering of elastomeric insulating material in inserting the sub-assembly in a casing of smaller transverse interior area than the normal transverse area of the sub-assembly, whereby the insulating material completely fills the space between the cells and the casing.

6. The step in manufacturing a battery comprising applying pressure longitudinally and traversely by forcing a sub-assembly of cells having a side covering of elastomeric insulating material through a tapered form in inserting the sub-assembly in a casing of smaller transverse interior area than the normal transverse area of the sub-assembly, whereby the insulating material completely fills the space between the cells and the casing.

7. The steps in manufacturing a battery, comprising inserting a sub-assembly of cells covered with plastic insulating material in a casing, placing the casing in a mold, and compressing the sub-assembly in the casing while heated to a temperature sufficient to cause the plastic material to flow, whereby the insulating material completely fills the space between the cells and casing.

8. A method of manufacturing a battery, comprising assembling a unit including plates and separators with a plastic connector plate at one end and a plastic thimble at the other end, premolding this unit with a plastic sidewall insulating material to form a sub-assembly, compressing the sub-assembly within a battery casing, placing a pin plate adjacent the thimble, injecting fluid plastic material into voids between the pin plate and thimble, and crimping an open end of the casing around the edge of the pin plate, whereby plastic insulating material completely fills the space between the cells and the casing.

9. The method of constructing a battery which comprises compressing a sub-assembly of plastic insulating material and cells within a battery casing, placing a pin plate adjacent the end of the sub-assembly, crimping an open end of the casing around the edge of the pin plate, and injecting fluid plastic material into the voids between the pin plate and the sub-assembly whereby plastic insulating material completely fills the space between the cells and the casing.

10. The method of constructing a battery which comprises contracting a sub-assembly of plastic insulating material and cells and inserting the sub-assembly in a battery casing, placing a pin plate adjacent the end of a sub-assembly, and crimping an open end of the casing around the edge of the pin plate, and injecting fluid plastic material into the voids between the pin plate and the sub-assembly, whereby plastic insulating material completely fills the space between the cells and the casing.

11. The process of manufacturing a battery which comprises contracting a sub-assembly of plastic insulating material and cells, expanding a battery casing, inserting the sub-assembly in the casing to expand the sub-assembly and contracting the casing, placing a pin plate adjacent to the end of the sub-assembly, crimping an open end of the casing around the edge of the pin plate, and injecting fluid plastic material into the voids between the pin plate and sub-assembly whereby plastic insulating material completely fills the space between the cells and the casing.

12. The method of constructing a battery which comprises contracting a sub-assembly of cells covered with plastic insulating material by cooling the sub-assembly below atmospheric temperature, expanding a battery casing by heating it substantially above atmospheric temperature, inserting said cold sub-assembly into said hot casing to expand the sub-assembly and contracting the casing by cooling it to atmospheric temperature, securing a pin plate adjacent to the end of the sub-assembly by crimping an open end of the casing around the edge of the pin plate, and injecting fluid plastic material into voids between the pin plate and the sub-assembly, whereby plastic insulating material completely fills the space between the cells and the casing.

13. The method of manufacturing a battery which comprises applying pressure longitudinally and traversely to a sub-assembly of cells having a side covering of elastomeric insulating material, inserting the sub-assembly in a casing of smaller transverse interior area than the normal transverse area of the sub-assembly, securing a pin plate adjacent to the end of the sub-assembly, by crimping an open end of the casing around the edge of the pin plate, and injecting fluid plastic material into the voids between the pin plate and the sub-assembly whereby plastic insulating material completely fills the space between the cells and the casing.

14. The method of manufacturing a battery which comprises applying pressure longitudinally and traversely by forcing a sub-assembly of cells having a side covering of elastomeric insulating material through a tapered form while inserting the sub-assembly in a casing of smaller transverse interior area than the normal transverse area of the sub-assembly, placing a pin plate adjacent to the end of the sub-assembly, crimping the open end of the casing around the edge of the pin plate, and injecting fluid plastic material into the voids between the pin plate and the sub-assembly whereby plastic insulating material completely fills the space between the cells and the casing.

15. The method of manufacturing a battery which comprises inserting a sub-assembly of cells covered with plastic insulating material in a casing, placing the casing in a mold, and compressing the sub-assembly in the casing while heated to a temperature sufficient to cause the plastic material to flow, placing a pin plate adjacent to the end of the sub-assembly, crimping the open end of the casing around the edge of the pin plate, and injecting fluid plastic material in the voids between the pin plate and the sub-assembly whereby plastic insulating material completely fills the space between the cells and the casing.

16. The method of constructing a battery which comprises assembling a plurality of annular cells, applying a plastic contact plate to one end of said cells, and a plastic thimble to the opposite end of said cells, applying a covering of plastic insulating material around said cells to produce a sub-assembly, providing a substantially cylindrical metal casing having openings adapted to receive the contact plate, said casing having a smaller transverse interior area than the normal transverse exterior area of the sub-assembly, inserting the sub-assembly in said casing with the contact plate in register with the openings in said casing, applying a terminal plate to the plastic thimble, crimping the casing over the terminal plate, and injecting fluid plastic insulating material into the voids between the terminal plate and the thimble whereby plastic insulating material completely fills the space between the cells and the casing.

17. The method of manufacturing a battery, which comprises providing a sub-assembly of annular cells with a plastic connector plate at one end and an annular plastic thimble at the other end, providing a metallic casing having an interior diameter slightly smaller than the normal outside diameter of the sub-assembly, compressing the sub-assembly within the casing, placing a pin plate adjacent the thimble, crimping the open end of the casing around the edge of the pin plate, and injecting fluid plastic material into the voids between the pin plate and thimble, whereby plastic insulating material completely fills the space between the cells and the casing.

References Cited in the file of this patent

UNITED STATES PATENTS

| | | |
|---|---|---|
| 1,281,421 | Rhoades | Oct. 15, 1918 |
| 1,285,660 | Ford | Nov. 26, 1918 |
| 1,370,054 | Schulte | Mar. 1, 1921 |
| 1,516,632 | Olaneta | Nov. 25, 1924 |
| 1,733,866 | Crossley | Oct. 29, 1929 |